June 23, 1964  J. J. DUGGAN  3,138,407
WHEELS
Filed Feb. 25, 1963  2 Sheets-Sheet 1
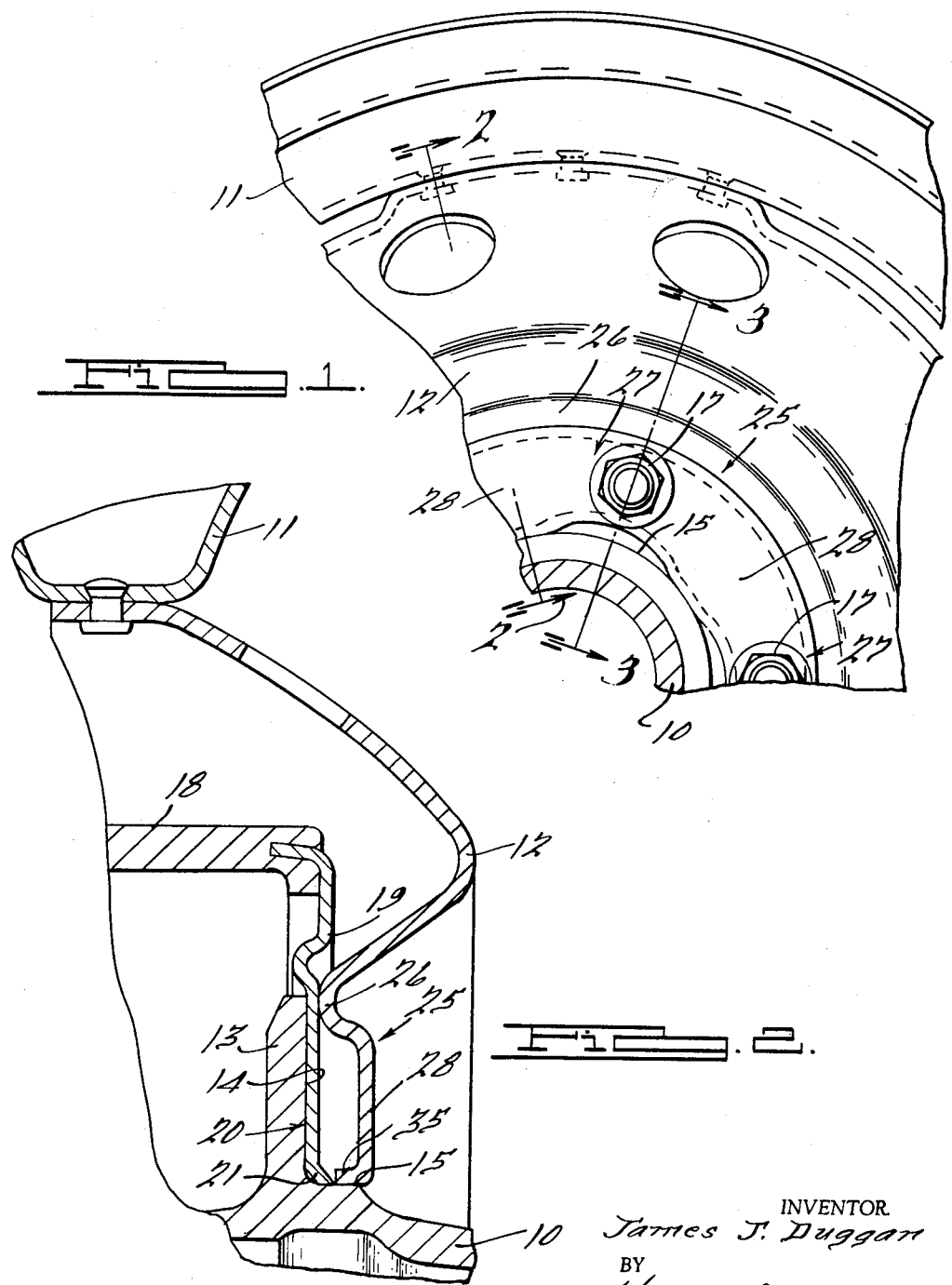
INVENTOR.
James J. Duggan
BY
Harness, Dickey & Pierce
ATTORNEYS.

June 23, 1964  J. J. DUGGAN  3,138,407
WHEELS
Filed Feb. 25, 1963  2 Sheets-Sheet 2
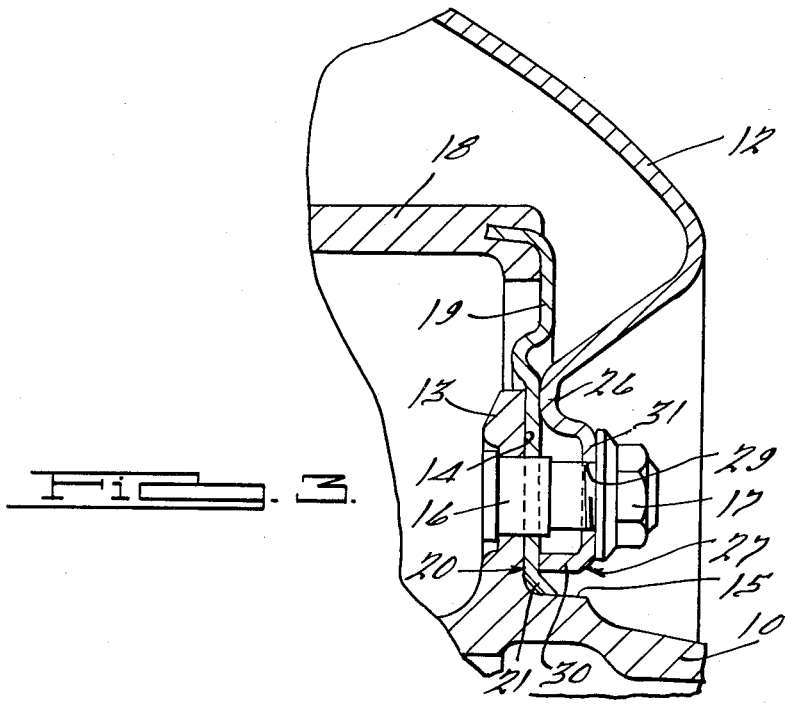
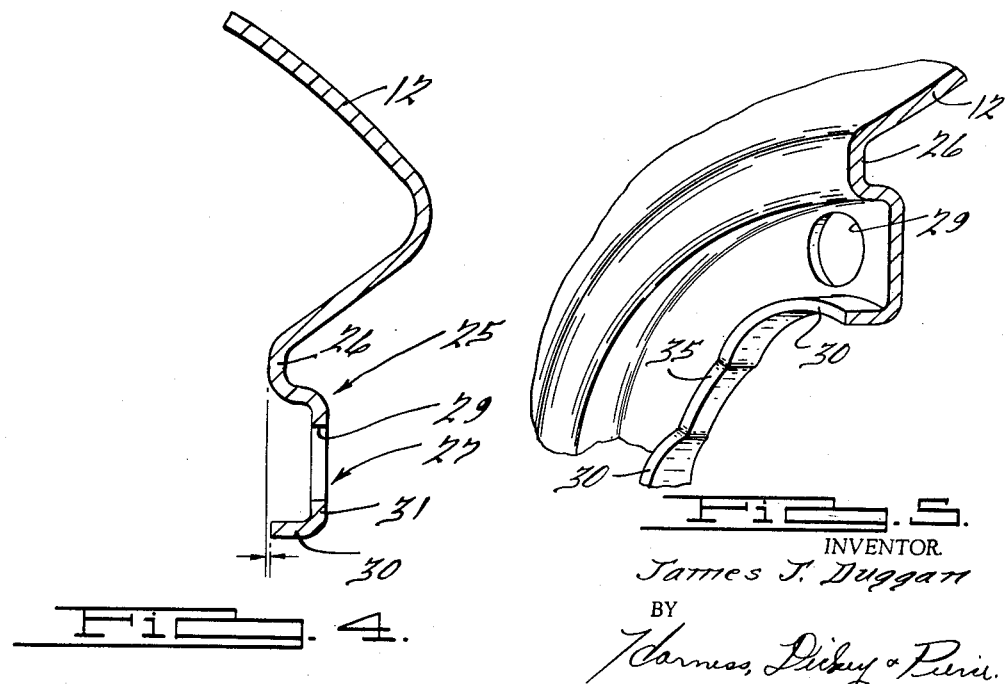
INVENTOR.
James J. Duggan
BY
ATTORNEYS.

United States Patent Office 3,138,407
Patented June 23, 1964

1

3,138,407
WHEELS
James J. Duggan, Dearborn, Mich., assignor to Kelsey-Hayes Company, Romulus, Mich., a corporation of Delaware
Filed Feb. 25, 1963, Ser. No. 260,710
10 Claims. (Cl. 301—9)

This invention relates to wheels and, more particularly, to motor vehicle wheels.

One of the primary objects of the invention is to provide an improved construction of wheel whereby the wheel body may be effectively mounted on the wheel hub.

Another object of the invention is to provide a wheel body, the inner peripheral mounting portion of which is fashioned to provide undulations alternately adapted to receive the wheel securing bolts and to center the wheel on the pilot portion of the wheel hub.

A further object of this invention is to provide a wheel body which may be securely mounted on the wheel hub without the formation of bosses or ribs or the like in the wheel body, thus eliminating the expense and cost of maintenance of the dies required to form such bosses and ribs.

Still another object of the invention is to form the bolt receiving areas of the body whereby to provide columnar strength therein and also to provide sufficient resiliency so that the clamping nuts are effectively secured in their clamping position.

A still further object is to provide the undulating portion of the wheel body with an inboard extending flange, varying in width with the undulations, so as to provide portions of greater width engaging the planar surface of the brake drum web and narrower portions adapted to clear the fillets formed at the periphery of the brake drum web.

Another object of the invention is to provide a vehicle wheel which is so reduced in the number and character of its component parts as to approach the ultimate in structural simplicity and thus may be manufactured at a very nominal cost.

The various objects and advantages, and the novel details of construction of one commercially practical embodiment of the invention, will become more apparent as this description proceeds, especially when considered in connection with the accompanying drawings, in which:

FIGURE 1 is a side elevational view of a portion of a vehicle wheel constructed in accordance with this invention;

FIGURE 2 is an enlarged fragmentary sectional view taken substantially on the plane indicated by line 2—2 in FIGURE 1;

FIGURE 3 is an enlarged fragmentary sectional view taken substantially on the plane indicated by line 3—3 in FIGURE 1;

FIGURE 4 is a detail sectional view of the wheel body before the same is secured to the wheel hub; and FIGURE 5 is a fragmentary perspective view of a portion of the wheel body.

Referring now more particularly to the drawings, it will be noted that the wheel assembly comprises a hub 10, a tire carrying rim 11, and a wheel body 12 mounted on the hub and carrying the rim. The hub is provided with a fixed radial flange 13 having a planar annular surface or face 14 and a pilot portion 15. The hub has fixedly secured to its radial flange an annular series of axially extending bolts 16, the outboard ends of which are adapted to be threadedly engaged by nuts 17. The bolts and nuts 16 and 17 form the means for securing the wheel body 12 to the hub.

It is usually customary to provide each wheel with a brake drum and, in the embodiment of the invention herein illustrated, there is provided a brake drum 18 having a web 19, the planar annular surface 20 of which is adapted to seat against the coplanar annular surface 14 of the radial flange 13. The inner peripheral edge 21 of the web portion is bent or curved in an outboard direction to form a fillet portion which engages the pilot portion 15 of the hub, as shown in FIGURES 2 and 3. This fillet portion 21 engages the pilot portion 15 of the hub to center and assist in supporting the brake drum web 19.

The wheel body 12 is provided with a mounting portion, indicated generally by the reference character 25. This mounting portion comprises an annular inboard extending boss or rib 26 spaced from the inner peripheral edge of the mounting portion and adapted to engage the adjacent planar surface of the brake drum web 19.

The mounting portion is formed with alternately arranged, radially offset portions 27 and 28, the outer radially offset portions being designated by the reference character 27 and the inner radially offset portions being designated by the reference character 28.

The outer radially offset portions 27 are provided with apertures 29 to receive the wheel securing bolts 16. The inner periphery of the mounting portion adjacent each outer radially offset portion 27 is provided with an inboard extending flange 30 which, when the nuts 17 are secured in place, engages the adjacent planar surface of the brake drum web 19. The flange 30, at the outer radially offset portions 27, is of less axial width than the annular boss 26, as shown in FIGURE 4, so that when the wheel body 12 is being attached to the hub, the annular boss 26 will be the first to engage the brake drum web 19, and when the nuts 17 are clamped in place, the flanges 30 will be drawn into engagement with the brake drum web 19. This will spring the mounting portion into engagement with the brake drum web to provide a resiliency to hold the nuts in clamping position. The portion or section 31 of the mounting portion between the annular boss 26 and the flanges 30 is spaced from the adjacent planar surfaces of the brake drum web and forms a radial column which adds strength and rigidity to the areas which receive the wheel securing bolts 16.

The radially inwardly offset portions 28 are provided with flanges 35 which are narrower than the flanges 30. These flanges rest upon the pilot portion 15 of the hub to center the wheel body thereon. By making the flanges 35 narrower, they may engage the pilot portion 15 of the hub without interference of the fillet portions 21 of the brake drum web, as illustrated most clearly in FIGURE 2.

By providing the inner periphery of the mounting portions 25 with the alternately arranged, radially offset portions, the inner periphery formed by the flanges 30 and 35 is formed with a series of undulations, as illustrated best probably in FIGURES 1 and 5. The flanges 30 and 35 of different width merge at the places where the undulations change their direction, as shown best probably in FIGURE 5.

With the construction heretofore described, it will be apparent that the construction of the wheel body is simplified and the necessity for the formation of numerous bosses or ribs or the like on the wheel body is eliminated, thus eliminating the expense and costly maintenance of the dies required to form such bosses and ribs. The undulating configuration of the mounting portion provides alternately radially offset portions adapted, respectively, to receive the wheel securing bolts and to center the wheel on the pilot portion of the wheel hub. The simplicity of the construction and its configuration provide greater fatigue life to the wheel.

While one type of clamping nut 17 has been illustrated, it will be obvious that either cone nuts or skirted nuts may be employed. Also, while a drop center type rim has been illustrated, any other suitable type of rim may be employed.

While one commercially practical embodiment of the invention has been described and illustrated herein somewhat in detail, it will be understood that various changes may be made as may come within the purview of the accompanying claims.

What is claimed is:

1. A vehicle wheel assembly comprising a wheel hub having an annular series of axially extending wheel securing bolts and an annular pilot portion, and a wheel body, the inner periphery of said wheel body being provided with alternately arranged, radially offset portions, the outer radially offset portions being provided with apertures to receive said wheel securing bolts and said inner radially offset portions being provided with means for engaging the pilot portion of said hub.

2. A vehicle wheel assembly comprising a wheel hub having an annular series of axially extending wheel securing bolts mounted thereon and an annular pilot portion, and a wheel body having a mounting portion comprising an annular inboard extending boss adjacent the inner peripheral edge of the mounting portion adapted to engage an adjacent planar surface of said wheel, alternately arranged, radially offset portions connected to said boss, each outer radially offset portion being provided with an aperture to receive a wheel securing bolt, and an inboard extending flange of less width than said boss adapted to engage said planar surface when the wheel securing bolt is tightened.

3. A vehicle wheel assembly comprising a wheel hub having a fixed radial flange, an annular series of axially extending wheel securing bolts carried by said flange and nuts therefor, and an annular pilot portion, a brake drum having a web portion secured to said flange, and a wheel body having a mounting portion comprising, an annular inboard extending boss spaced from the inner peripheral edge of the mounting portion adapted to engage an adjacent planar surface of said web portion, alternately arranged radially offset portions connected to said boss, each radially outer offset portion being provided with an aperture to receive a wheel securing bolt and with an inboard extending flange of less width than said boss adapted to engage said planar surface when the nut is tightened on said bolt to resiliently hold said nut in clamping position.

4. A vehicle wheel assembly comprising a wheel hub having a fixed radial flange, an annular series of axially extending wheel securing bolts carried by said flange and nuts therefor, and an annular pilot portion, a brake drum having a web portion secured to said flange, and a wheel body having a mounting portion comprising, an annular inboard extending boss spaced from the inner peripheral edge of the mounting portion adapted to engage an adjacent planar surface of said web portion, alternately arranged radially offset portions connected to said boss, each radially outer offset portion being provided with an aperture to receive a wheel securing bolt, and each radially inner offset portion being provided with an angularly extending flange for engaging the pilot portion on said hub.

5. A vehicle wheel assembly comprising a wheel hub having a fixed radial flange, an annular series of axially extending wheel securing bolts carried by said flange and nuts therefor, and an annular pilot portion, a brake drum having a web portion secured to said flange, with an edge thereof forming a fillet engaging said pilot portion, and a wheel body having a mounting portion comprising, an annular inboard extending boss spaced from the inner peripheral edge of the mounting portion adapted to engage an adjacent planar surface of said web portion, alternately arranged radially offset portions connected to said boss, each outer radially offset portion being provided with an aperture to receive a wheel securing bolt, and each inner radially offset portion being provided with an inboard extending flange engaging said pilot portion on the hub to a point adjacent the said fillet portion of the web.

6. A vehicle wheel assembly comprising a wheel hub having a fixed radial flange, an annular series of axially extending wheel securing bolts carried by said flange and nuts therefor, and an annular pilot portion, a brake drum having a web portion secured to said flange, and a wheel body having a mounting portion comprising, an annular inboard extending boss spaced from the inner peripheral edge of the mounting portion adapted to engage an adjacent planar surface of said web portion, alternately arranged radially offset portions connected to said boss, each outer radially offset portion being provided with an aperture to receive a wheel securing bolt and with an inboard extending flange at its inner edge spaced from said boss and providing a portion having columnar strength therebetween, said flange being of less width than said boss and adapted to engage said planar surface when the nut is tightened on the bolt to resiliently hold said nut in clamping position.

7. A vehicle wheel assembly comprising a wheel hub having a fixed radial flange, an annular series of axially extending wheel securing bolts carried by said flange and nuts therefor, and an annular pilot portion, a brake drum having a web portion secured to said flange, and a wheel body having a mounting portion comprising, an annular inboard extending boss spaced from the inner peripheral edge of the mounting portion adapted to engage an adjacent planar surface of said web portion, alternately arranged radially offset portions connected to said boss, each radially outer offset portion being provided with an aperture to receive a wheel securing bolt and with an inboard extending flange of less width than said boss adapted to engage said planar surface when the nut is tightened on said bolt to resiliently hold said nut in clamping position, and each radially inner offset portion being provided with an angularly extending flange for engaging the pilot portion on said hub.

8. A vehicle wheel assembly comprising a wheel hub having an annular series of axially extending wheel securing bolts and an annular pilot portion, and a wheel body, the inner periphery of said wheel body being provided with alternately arranged, radially offset portions, the outer radially offset portions being provided with apertures to receive said wheel securing bolts and with inboard extending portions engageable with an adjacent planar portion of the wheel, and said inner radially offset portions being provided with means for engaging the pilot portion of said hub.

9. A vehicle wheel assembly comprising a wheel hub having an annular series of axially extending wheel securing bolts and an annular pilot portion, and a wheel body, the inner periphery of said wheel body being provided with alternately arranged, radially offset portions, the outer radially offset portions being provided with apertures to receive said wheel securing bolts and with inboard extending portions engageable with an adjacent planar portion of the wheel, said inner radially offset portions being provided with inboard extending portions engaging the pilot portion of said hub, said first and second mentioned inboard extending portions being alternately axially offset.

10. A vehicle wheel assembly comprising a wheel hub having an annular series of axially extending wheel securing bolts and an annular pilot portion, an annular wheel body having a plurality of apertures arranged to receive said bolts and a flange at its inner periphery, said flange being provided with a first set of spaced portions engageable with said hub pilot portion and a second set of spaced portions which is offset from said first set of portions in radially outward and axially inboard directions, said first and second sets of portions being alternately arranged and said second set of portions being radially aligned with said apertures.

References Cited in the file of this patent

UNITED STATES PATENTS

| | | |
|---|---|---|
| 2,317,311 | Stough | Apr. 20, 1943 |
| 2,640,728 | Slack | June 2, 1953 |
| 2,885,244 | Smith | May 5, 1959 |

FOREIGN PATENTS

| | | |
|---|---|---|
| 754,725 | Great Britain | Aug. 15, 1956 |